April 21, 1970
W. W. CAMPBELL ET AL
3,508,026
AUTOMATIC WELDING APPARATUS
Filed May 10, 1967
3 Sheets-Sheet 3
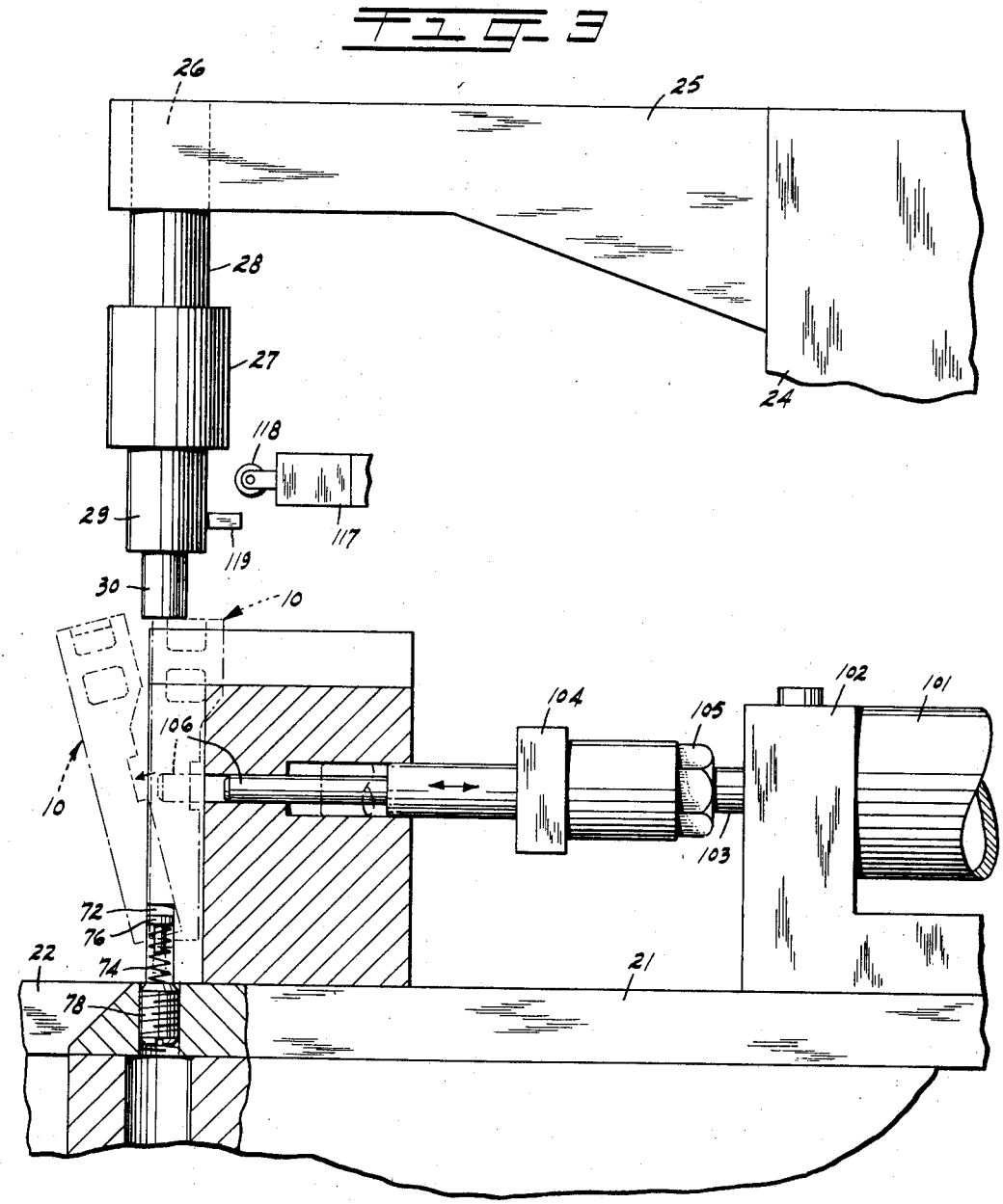

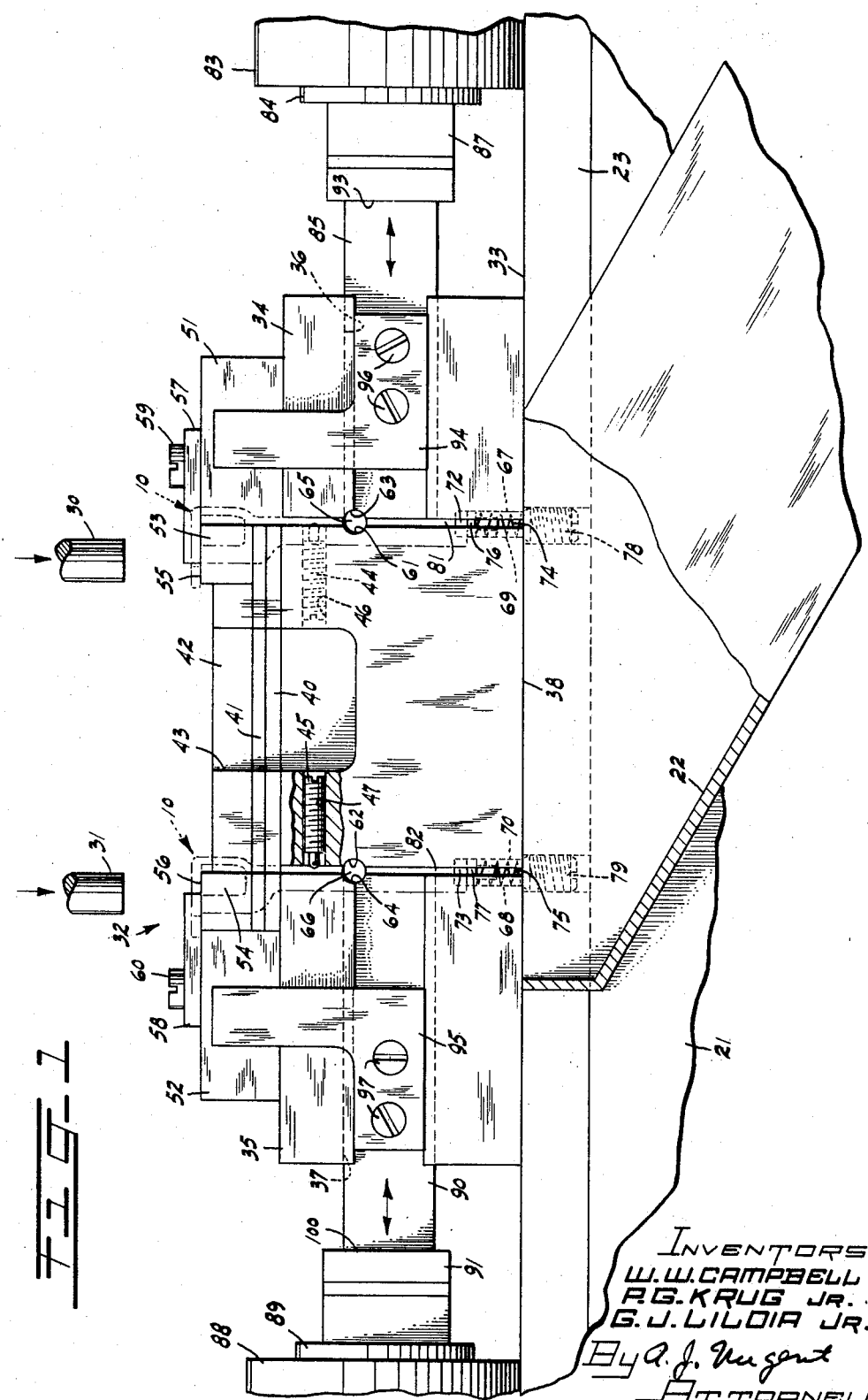

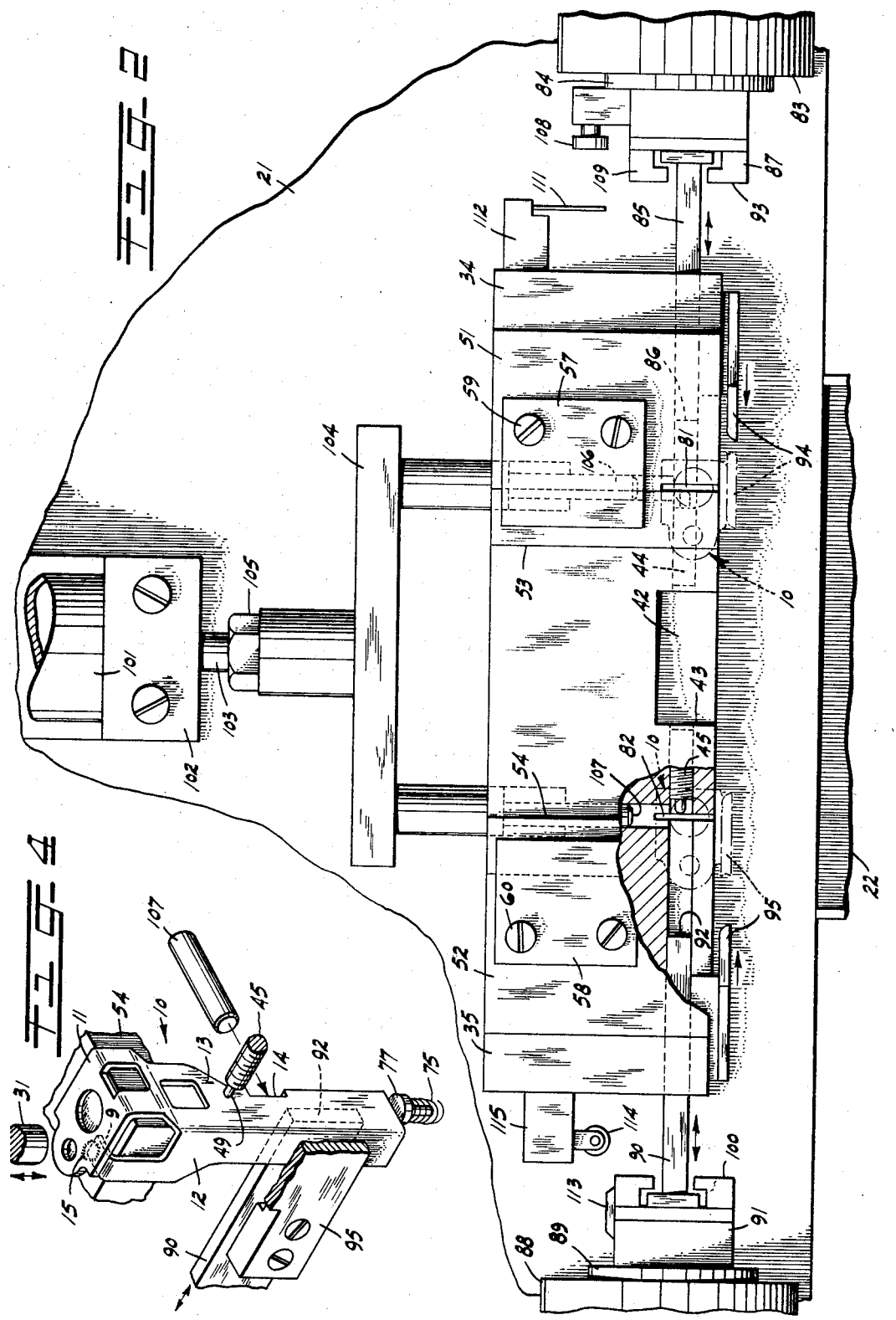

United States Patent Office 3,508,026
Patented Apr. 21, 1970

3,508,026
AUTOMATIC WELDING APPARATUS
William W. Campbell, Long Valley, Philip G. Krug, Jr., Colonia, and Gerard J. Liloia, Jr., Bloomfield, N.J., assignors to Western Electric Company, Incorporated, New York, N.Y., a corporation of New York
Filed May 10, 1967, Ser. No. 637,499
Int. Cl. B23k 11/02
U.S. Cl. 219—78    6 Claims

ABSTRACT OF THE DISCLOSURE

An apparatus especially suitable for welding together portions of a three-sided article such as a telephone jack frame. The apparatus includes means for positioning and securing the article, actuating means to effect the weld, and means for releasing and ejecting the article upon completion of the welding operation.

BACKGROUND OF THE INVENTION

Field of the invention

The invention is concerned with the welding together of three-sided articles, such as the jack frames of telephone jacks. It is essential that the articles are precisely positioned and that the apparatus is capable of rapidly welding articles fed thereto on a mass production basis.

Description of the prior art

There are, of course, many known welding units for welding together parts of an article by means of a pair of electrodes. However, no welding unit is known which is designed for welding portions of three-sided articles, such as telephone jack frames, rapidly on a mass production basis. Patent 2,818,484 shows a box welding apparatus designed for welding together the corners of a plastic box but such apparatus would not be suitable for the welding of articles such as telephone jack frames.

Summary of the invention

An object of this invention is to provide an apparatus for positioning a three-sided article, such as a telephone jack frame, with respect to a pair of welding electrodes and automatically welding together portions of the article.

The invention includes means for the positioning and clamping a pair of jack frames in engagement with a pair of lower welding electrodes seated respectively on a pair of corner supports. After the positioning and clamping takes place, actuating means operate a pair of upper electrodes which cooperate with the corresponding lower electrodes in welding portions of the respective jack frame portions together. Thereafter, means are operative for automatically ejecting the welded jack frames from the apparatus. While the apparatus has been designed to simultaneously weld together portions of pairs of jack frames, it can obviously be used for single jack frames.

Brief description of the drawings

FIG. 1 is a front elevational view, partly in section, of a portion of the welding apparatus embodying the electrode and clamping structure of this invention;

FIG. 2 is a plan view, partly in section, of the lower electrodes, and the clamping and ejection devices embodied in this invention;

FIG. 3 is a side view, partly in section, of the upper electrode and the ejection structure, and FIG. 4 is an isometric view of an article positioned for welding.

Detailed description

Referring to the drawings, particularly FIG. 4, the article or jack frame 10 comprises a flat head or side 11, and integral sides 12, 13 extending therefrom substantially normal to each other. A notch 14 on the edge of side 13 is located such as to come in contact with an ejection means to be described later. The head 11 which is integral with side 13 is resting on a bent over portion 9 at the top of side 12 whereat the weld spot 15 is made when the head 11 and side 12 are welded together. The interior surface planes of head 11, and sides 12, 13 in essence form a cubic corner.

Referring now to FIGS. 1 and 2, the welding apparatus includes a base member 21, a chute 22 connected to the plate 23 of the base member 21, a vertical support member 24, and a horizontal support member 25 extending from the vertical support member 24 (FIG. 3) in cantilever fashion over the base member 21.

Referring now to FIG. 3, a horizontal support member 25 houses a vertically extending cylinder 26. A ram 27 is coupled to the cylinder by means of piston 28 and carries at its lower end upper electrode holder 29, and a pair of upper electrodes 30, 31 (FIG. 1). The cylinder 26 is operated by means of a motor (not shown) to lower the ram 27 into the welding position.

As shown in FIGS. 1 and 2, a lower electrode structure 32 is mounted on top plate 33 of the base member 21. The lower electrode structure 32 is comprised of two clamp guide blocks 34, 35 each containing a recess or clamp guideway 36, 37 respectively for clamp driving members 85, 90. The clamp guideways 36, 37 run the entire length of the clamp guide blocks 34, 35. The clamp guide blocks 34, 35 are mounted onto the top plate 33 in spaced relationship and are separated by an intermediate block 38 which is also secured to the top plate 33. An insulating strap 40 is mounted on top of intermediate block 38 while a conductor strap 41 is mounted above the insulating strap 40, and a holder 42 is mounted above the conductor strap 41. The insulating strap 40 and conductor strap 41 extend under lower electrodes 53 and 54 as well. Formed on the top center half of the intermediate block 38 is a clearance 43 which allows space to adjust two spring-pressed plungers 44, 45 located respectively in holes 46, 47. The holes 46, 47 are positioned on opposite sides of the intermediate block 38 beginning at the edges of the clearance 43 and extending to the end surfaces of said intermediate block 38. The spring plungers 44, 45 are used to firmly hold the jack frames 10 inserted by the operator in their respective support recesses 81, 82.

Secured to the top surface of each clamp guide block 34, 35 are two outside blocks 51, 52 separated by the intermediate block 38. Mounted at the front right corner of intermediate block 38 and the front right corner of outside block 52 are the two lower electrodes 53, 54, intermediate of which is the holder 42 which is above the block 38. The top surfaces 55, 56 of respective electrode 53, 54 are flush with the top surfaces of their respective outside blocks 51, 52. The electrodes 53, 54 are held in position by electrode clamps 57, 58 respectively secured by screws 59, 60.

Running the width of the locating block 38 are semicircular recesses 61, 62. Adjacent to the recesses 61, 62 are two additional semicircular recesses 63, 64 respectively running the width of the clamp guide blocks 34, 35. The adjacent recesses 61, 63 and 62, 64 cooperate to form holes 65, 66 necessary to guide ejection pins 106, 107 (FIG. 2) which are described later.

Located within the bottom of each clamp guide block 34, 35 are respective semicircular recesses 67, 68. Adjacent to said recesses 67, 68 are similar respective recesses 69, 70 located in the intermediate block 38. The cooperation of recesses 67, 69 and 68, 70 form holes 72, 73 which house springs 74, 75. Located within said springs 74, 75 are pins 76, 77 adjusted by set screws 78, 79. The set screws 78, 79 in cooperation with their respective pins 76, 77 and springs 74, 75 act as lifting pins to allow for the adjustment of the vertical position of the jack frames 10 within their support recesses 81, 82 formed by the space between the adjacent edges of the clamp guide blocks 34, 35 and the intermediate block 38.

To provide means for clamping the jack frame 10, on the right in FIG. 1, into welding position a clamping cylinder 83 is used. The clamping cylinder 83 is secured to the top plate 33 of the base member 21 and is mounted such that when piston 84 moves transversely towards the jack frame 10, left hand edge 86 (FIG. 2) of clamp driving member 85, which is secured to piston 84 by a clamp holder 87, is stopped adjacent to the side 13 of the jack frame 10.

A second clamping cylinder 88 is similarly mounted on the opposite side of the top plate 33 of base member 21 and is oriented in the opposite direction to clamping cylinder 83. Piston 89 of clamping cylinder 88 is connected to clamp driving member 90 by clamp holder 91. Right hand edge 92 (FIG. 2) of clamp 90 is stopped adjacent the side 13 of jack frame 10 on the left in FIG. 1. Attached to both clamp driving members 85, 90 are L-shaped retaining member 94, 95 secured to the clamps 85, 90 respectively by screws 96, 97. Clamp guideways 36, 37 are located in their respective clamp guide blocks 34, 35 to enable the retaining members 94, 95 to travel between their clamping and unclamping positions.

Referring to FIGS. 2 and 3, a third or ejection cylinder 101 is secured to the top plate 33 of base member 21 by block 102. The ejection cylinder 101 is positioned perpendicular to the horizontal axis of clamping cylinders 83, 88. Piston 103 of ejection cylinder 101 is secured to the ejection pin holder 104 by lock nut 105. Ejection pins 106, 107 are attached to the ejection pin holder 104 in spaced relationship so as to allow the ejection pins 106, 107 to seat into the pin holes 65, 66 (FIG. 1) thereby pushing against notch 14 of jack frames 10 forcing the pack frames 10 out of the support recesses 81, 82 and allowing them to fall into chute 22.

Referring to FIG. 2, a stop pin 108 is located on the reverse side 109 of clamp holder 87. The stop pin 108 is positioned so as to make contact, when advanced, with switch arm 111 of microswitch 112, the microswitch 112 being located towards the rear of clamp guide block 34 and controlling the operation of ram 27. Similarly, a small flat-ended cam 113 is attached to the rear surface of clamp holder 91 and makes contact, when advanced with the contact roller 114 of microswitch 115 causing the ejection cylinder 101 to operate. The microswitch 115 is located on the end surface of clamp guide block 35. A third microswitch 117 as shown in FIG. 3 is secured to the rear side of clamp guide block 35 so as to allow contact roller 118 to make contact with a stop-pin 119 located on the rear side of upper electrode holder 29.

Activation of microswitch 117 causes clamping cylinders 83, 88 to retract clamp driving members 85, 90 thereby unclamping the jack frames 10.

Not shown is a cooling block and the various electrical air, and water systems used by the apparatus but not necessary to an understanding of the invention.

In the normal operation of the welding apparatus two jack frames 10 are manually placed in the support recesses 81, 82 and retained therein by spring-pressed plungers 44, 45. A switch (not shown) is operated causing clamping cylinders 83, 88 to operate and allowing their associated clamp driving members 85, 90 to move towards the jack frames 10. As the edge 86 of clamp driving member 85 stops adjacent side 13 of jack frame 10, stop edge 93 of clamp holder 87 seats against the outside edge of clamp guide block 34. Similarly, edge 92 of clamp driving member 90 stops adjacent side 13 of the other jack frame 10 as stop edge 100 seats against the outside edge of clamp guide block 35. Retaining members 94, 95 at this time have been moved across sides 12 of jack frames 10 to retain the jack frames 10 in position respectively in recesses 81, 82.

As clamp driving members 85, 90 advance towards each other, stop pin 108 attached to clamp holder 87 makes contact with switch arm 111 of microswitch 112 which is secured to the side edge of clamp guide block 34. Operation of microswitch 112 causes ram 27 to descend so as to allow the upper electrodes 30, 31 to seat against the head 11 of jack frames 10 as the welding circuits operate. Head 11 of jack frame 10 is thus welded to side 12 and the ram 27 ascends to its original position. The descent, welding, and ascent functions are all initiated by the operation of microswitch 112.

As the ram 27 ascends, stop pin 119 makes contact with roller 118 of microswitch 117. Operation of microswitch 117 causes clamping cylinders 83, 88 to retract simultaneously, freeing the jack frames 10 in their respective support recesses 81, 82. As cylinder 88 causes clamp 90 to retract, cam 113 makes contact with the roller 114 of microswitch 115. Operation of microswitch 115 causes the ejection cylinder 101 to operate causing the ejector pins 106, 107 to push against the notches 14 of the jack frame 10. As a result, the jack frames 10 are ejected from their support recesses 81, 82 and fall into chute 22. As soon as the jack frames 10 are ejected, ejection cylinder 101 causes the piston 103 and the attached ejector pins 106, 107 to retract. Thereafter, two new jack frames 10 are manually inserted into place and the above operations are repeated.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. A welding apparatus for welding together portions of an article having three angularly disposed sides comprising:
   a first electrode having a three-sided corner for supporting the under surfaces of the angularly disposed sides of the article,
   a second electrode,
   a first holding means for pressing against a first side of said article to hold said article initially against said first electrode,
   a second holding means for holding a second side of said article,
   a third holding means for supporting said article with a third side of said article in a predetermined relationship to said first electrode, and
   means for causing relative movement of said first electrode and said second electrode to bring said second electrode and said third side of said article into engagement with each other to weld portions of said article together.

2. A welding apparatus according to claim 1 wherein: said second holding means comprises spaced, mutually opposed surfaces disposed to engage inner and outer surfaces of said second side of said article.

3. A welding apparatus according to claim 1 wherein: said first holding means comprises a spring-pressed pin.

4. A welding apparatus for welding together portions of an article having three angularly disposed sides comprising:
   a first electrode having a three-sided corner for supporting the under surfaces of the angularly disposed sides of the article,
   a second electrode,
   means for pressing against a first side of said article to hold said article against said first electrode, retaining means for holding a second side of said article, adjustable spring means for pressing against the bottom of the article for compensating for variations in the height of the article to be welded, and means for causing relative movement of said first electrode and said second electrode to bring said second electrode and a third side of the article into engagement with each other to weld portions of said article together.

5. A welding apparatus according to claim 1 including, in addition:

means for ejecting said article after portions thereof have been welded.

6. A welding apparatus for welding together portions of an article having three angularly disposed sides comprising:

a first electrode having a three-sided corner for supporting the under surfaces of the angularly disposed sides of the article;

a second electrode;

a spring-pressed pin adapted to press against a first side of said article to hold said article initially against said first electrode;

a holder having spaced, mutually opposed surfaces disposed to engage inner and outer surfaces of a second side of said article;

adjustable spring means for pressing against the bottom of said article to compensate for variations in the height of said article to be welded;

means for causing relative movement of said first electrode and said second electrode to bring said second electrode and a third side of the article into engagement with each other to weld portions of the article together; and means for ejecting said article after portions thereof have been welded.

References Cited

UNITED STATES PATENTS

| | | | |
|---|---|---|---|
| 1,154,470 | 9/1915 | Winfield et al. | 219—86 |
| 2,820,882 | 1/1958 | Johnson | 219—117 |

JOSEPH V. TRUHE, Primary Examiner

H. D. JAEGER, Assistant Examiner

U.S. Cl. X.R.

219—158, 161